Feb. 4, 1964   G. D. SIMONDS, JR   3,120,131
CONTROL MECHANISM

Filed Dec. 7, 1960   3 Sheets-Sheet 1

INVENTOR.
George D. Simonds Jr.

BY John W. Michael
Attorney

INVENTOR.
George D. Simonds Jr.
BY
John W. Michael
Attorney

Feb. 4, 1964  G. D. SIMONDS, JR  3,120,131
CONTROL MECHANISM
Filed Dec. 7, 1960  3 Sheets-Sheet 3

*INVENTOR.*
George D. Simonds Jr.
BY
John W. Michael
Attorney 3,120,131
CONTROL MECHANISM
George D. Simonds, Jr., Mequon, Wis., assignor to Badger Meter Manufacturing Company, Milwaukee, Wis., a corporation of Wisconsin
Filed Dec. 7, 1960, Ser. No. 74,371
4 Claims. (Cl. 74—157)

This invention relates to control mechanisms, and more particularly, to an improvement in the control mechanism described and claimed in application Serial Number 724,140, filed March 26, 1958, U.S. Patent No. 3,020,744, and assigned to the assignee of this application.

The object of this invention is to provide a device of this type which utilizes a minimum number of parts and provides improved accuracy and reliability with less cost.

Another object is to provide a device having the above advantages which has a fail-safe feature to prevent extensive damage to the device in the event of a failure of one of the component parts.

The device includes a mounting plate having a drive arm pivotally mounted thereon and means for oscillating the drive arm. A ratchet wheel is freely rotatably mounted on the plate and is driven by a drive pawl pivotally mounted on the drive arm as the drive arm oscillates. A double sided detent member pivotally mounted on the mounting plate is provided to engage the ratchet wheel and properly position and hold the wheel for step-by-step actuation thereof by the drive pawl.

The drive pawl and detent are pivoted between their respective operating positions by a reversing means which includes a reversing spring interconnected between the drive pawl and detent. It is important that the reversing spring transmit its force in a single plane to thus eliminate any twisting movement which causes frequent spring failures and thus a single turn torsion spring of coplanar configuration is used. The spring is mounted between the pawl and detent for coplanar movement by means of a pair of pins which extend into the common plane of the spring from opposite directions. The pins are so arranged so that their arcuate movement is such that although they will move in a common plane they will not collide.

A further feature of this invention is concerned with the problem of damage to the mechanism which could result if the pawl and detent were allowed to get out of phase because of a reversing spring failure for example. To obviate this possible source of trouble the detent is provided with a pair of fail-safe abutments or radii formed thereon and adapted for engagement by the pawl as the pawl is pivoted from one driving position to another. Thus, a positive driving engagement is provided between the pawl and detent to thereby prevent the parts from ever getting out of phase with each other.

Other objects and advantages will be pointed out in, or be apparent from, the specification and claims, as will obvious modifications of the single embodiment shown in the drawings, in which:

Figure 5:
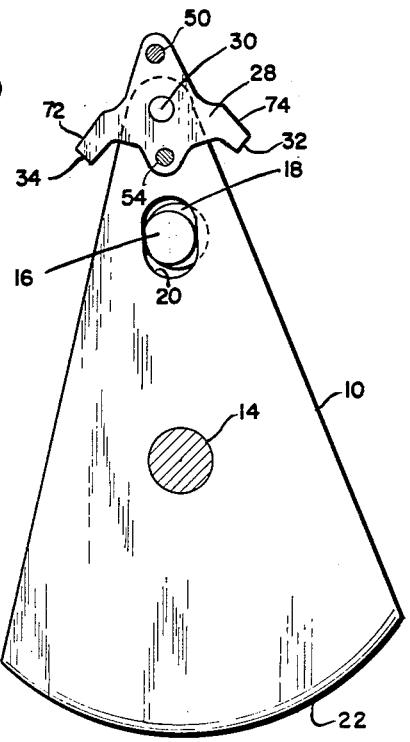
FIG. 5 is a fragmentary top plan view of the drive arm with some of the parts removed to show the means for oscillating the drive arm.

As shown in the drawings, the device includes a drive arm 10 pivotally mounted on a mounting plate 12 by a pin 14. Arm 10 is caused to oscillate back and forth through a predetermined angle about the axis of pin 14 by any suitable means such as that shown in FIG. 5 wherein an eccentric end portion 16 of a rotating drive spindle 18 is drivingly engaged in an elongated opening 20 in the drive arm. The end portion of the drive arm has a downwardly crimped edge 22 which serves to maintain the drive arm in a plane parallel to the mounting plate as the drive arm is oscillated by spindle 18.

The mechanism for counting the oscillations of arm 10 includes a ratchet wheel 24 rotatably mounted on base plate 12 by pin 14 over the drive arm 10. Wheel 24 has ratchet teeth 26 cut in the peripheral edge thereof for engagement by doublesided pawl 28 adapted to drive the ratchet wheel step-by-step in either direction. Pawl 28 is pivotally mounted on arm 10 by a pin 30 and has two noses 32 and 34 so formed that when the arm is oscillated, either nose 32 or nose 34 will engage teeth 26 and drive the ratchet wheel step-by-step (one tooth at a time) in either a counterclockwise or a clockwise direction depending on the position of pawl 28 on arm 10.

The operating position of drive pawl 28 is controlled by an improved reversing means presently to be described. In addition to providing proper control of the drive pawl, it is important in a device of this type that a minimum of work be required to operate the device. For this reason, ratchet wheel 24 is mounted for free rotation on plate 12 to thereby minimize the energy required at spindle 18 to drive the device. Since the friction in the rotatable mounting of ratchet wheel 24 is kept at a minimum, a suitable detent means must be provided to properly index the wheel during the step-by-step rotation thereof by drive pawl 28.

In application Serial No. 724,140 mentioned above, the control means for the drive pawl and the detent means for the ratchet wheel were comprised of two separate assemblies of component parts. In the control device disclosed herein, both the drive pawl control function and the ratchet wheel indexing function have been combined into a single assembly comprising a reduced number of parts which function together to provide both the drive pawl reversing and detent operations.

The reversing and indexing assembly includes a double-legged detent member 36 pivotally mounted on base plate 12 by a pin 38. Detent 36 has a pair of indexing noses 40 and 42 formed on the legs thereof adapted for alternative engagement with teeth 26 of ratchet wheel 24. The assembly further includes an actuator member 44 mounted on detent 36 by rivets 46 and a ring-shaped reversing spring 48 operatively connected between the drive pawl and the detent by means of pins 50 and 52 on pawl 28 and actuator 44 respectively.

Drive pawl 28 and detent 36 are pivoted from one operating position to another as a reversing pin 54 on the pawl is driven by arm 10 against one or the other of angularly spaced abutments 56 and 58 on ratchet 24 as will presently be described.

Figure 6:
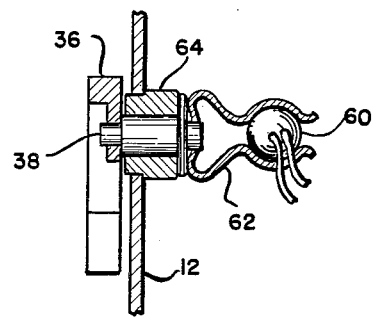
FIG. 6 is a vertical sectional view taken along line 5—5 of FIG. 1 showing a control switch for performing a control function when the detent member is actuated by the drive pawl.
Figure 7:
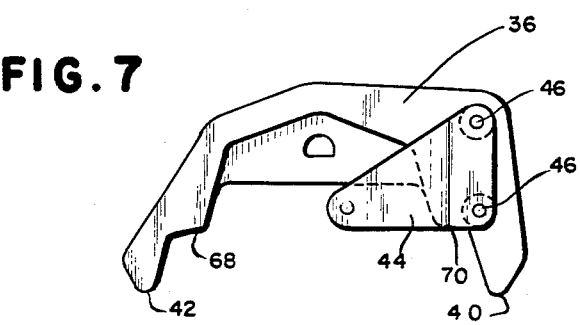
FIGS. 7 and 8 are top plan and side elevation views, respectively, of the detent member.
Figure 8:
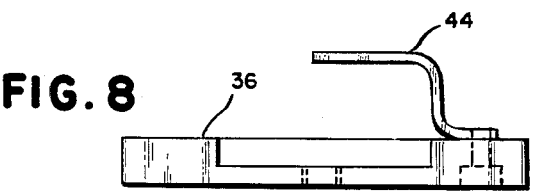

As shown in detail on FIG. 6 detent 36 is freely rotatably mounted on plate 12 by a pin 38 which extends through the plate to facilitate the mounting of a mercury switch 60 thereon. Detent 36 is staked to one end of pin 38 and a switch bracket 62 is staked to the other end with a spacer sleeve 64 fitted therebetween which acts as a bearing for the entire assembly. Thus it is seen that switch 60 will be pivoted with detent 36 to thereby relate the movement of the detent to a control instrumentality.

Figure 1:
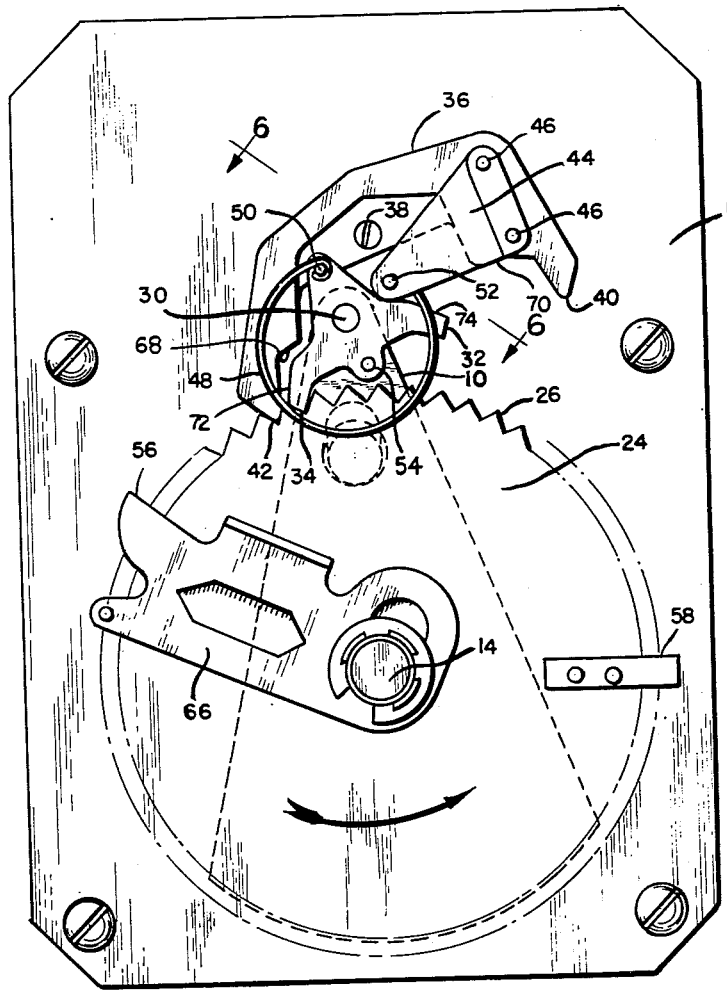
FIG. 1 is a top plan view of a device embodying the present invention.
Figure 2:
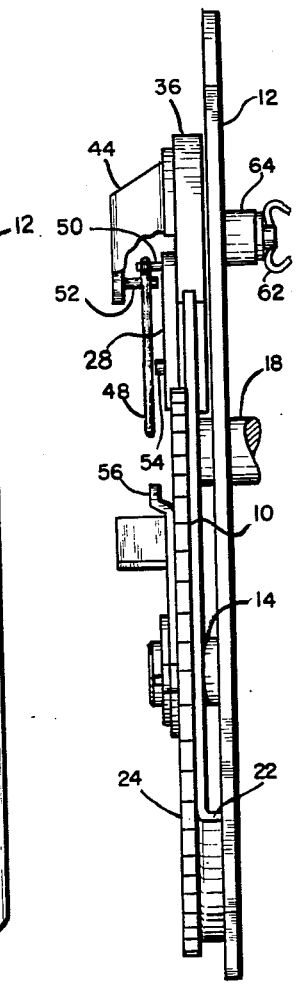
FIG. 2 is a view in side elevation of the device shown in FIG. 1.
Figure 3:
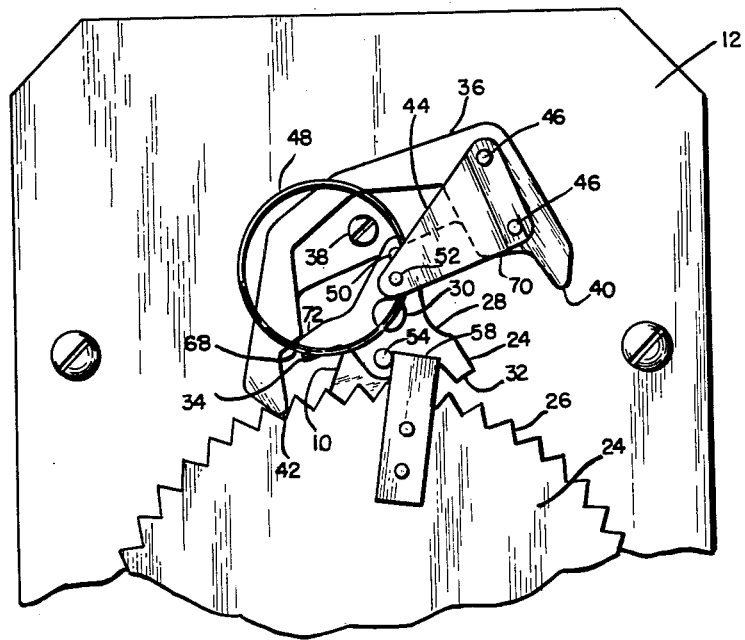
FIGS. 3 and 4 are views similar to FIG. 1 showing the sequence of operation of the device as it moves through a reversing operation.
Figure 4:
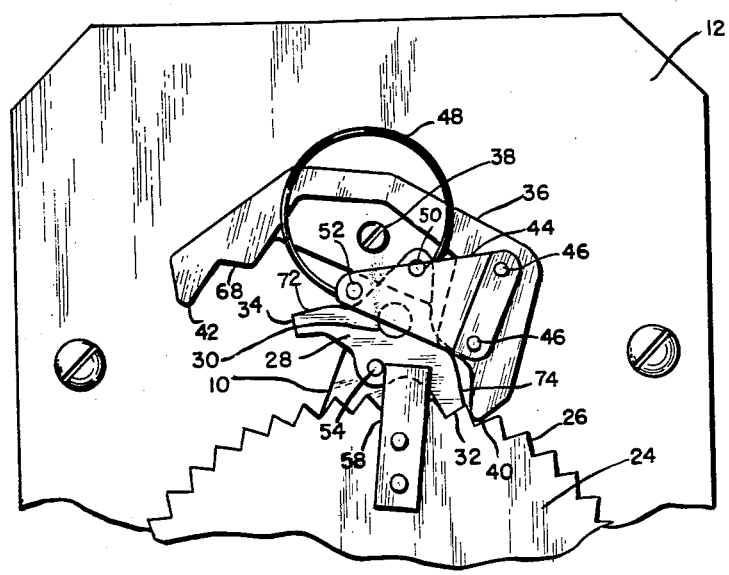

Referring now to FIGS. 1, 3 and 4, a typical sequence of operation of the device is as follows:

With drive pawl 28 and detent 36 in the FIG. 1 positions, both driving nose 34 of the pawl and indexing nose 42 of the detent are urged into engagement with teeth 26 of the ratchet wheel by spring 48. As drive arm 10 is oscillated by rotating spindle 18, wheel 24 will be driven step-by-step, one tooth at a time, in a counterclockwise direction (as indicated by the arrow in FIG. 1). The ratchet wheel is properly indexed after each oscillation of the drive pawl by indexing nose 42 which positively blocks any back-up of the wheel and limits forward movement thereof to one tooth.

Step-by-step counterclockwise rotation continues until fixed abutment 58 on ratchet wheel 24 moves into position whereby reversing pin 54 on pawl 28 will be driven against the abutment causing the pawl to pivot. This happens when abutment 58 reaches a point whereby it lies immediately adjacent reversing pin 54 when at the same time drive arm 10 has reached the limit of its angular oscillation to the left (as viewed in the drawings). The succeeding one-half oscillation of the arm to the right (FIG. 3) will drive pin 54 against the now stationary abutment 58 causing pawl 28 to pivot about pin 30. As previously stated, indexing nose 42 of detent 36 positively blocks back-up (clockwise movement) of the ratchet wheel and thereby holds the wheel stationary during the actuation of the pawl which takes place as the drive arm oscillates with the ratchet wheel stationary. It is of critical importance in this regard that the pawl 28, detent 36 and spring 48 be so interrelated so that detent 36 will not be pivoted from indexing position (FIGS. 1 and 3) until pawl 28 has been pivoted past its over-center position with respect to spring 48 and detent 36.

As pawl 28 passes over-center as shown in FIG. 3, spring 48 is designed to not only snap the pawl the rest of the way to its FIG. 4 position but to also actuate detent 36 to pivot it from the position shown in FIG. 3 to that shown in FIG. 4. As detent 36 is pivoted, switch 60 will be actuated to perform the desired control function. The operating positions of both pawl 28 and detent 36 have thus been reversed to a position (FIG. 4) whereby drive nose 32 of pawl 28 and indexing nose 40 of detent 36 will be biased into engagement with teeth 26 of ratchet wheel 24. The parts are now in position (FIG. 4) for step-by-step rotation of wheel 24 in a clockwise direction as arm 10 continues to oscillate. Nose 32 of drive pawl 28 will drive wheel 24 clockwise until an adjustable abutment 56 on pointer arm 66 makes contact with reversing pin 54 on the pawl to again reverse the parts in the manner previously described. The intervals between actuations of switch 60 are thus defined by a given number of control arm oscillations (spindle 18 rotations). Such given number can be preset by varying the angular position of pointer arm 66 with respect to stationary abutment 58.

From the foregoing it will be appreciated that the entire reversing operation and switch actuation is accomplished in just a single one-half oscillation of arm 10. It should also be noted that reversing spring 48 performs several distinct functions in the operation of the device. First it acts to bias both pawl 28 and detent 36 into engagement with the ratchet wheel when such parts are in either one of the two driving positions. Secondly, the spring provides an over-center snap actuation characteristic to pawl 28 so that the pawl can be moved to a point of no return before the detent is pivoted out of its indexing position. Thirdly, spring 48 serves as a mechanical link between pawl 28 and detent 36 to pivot the detent in response to movement of the pawl during the reversing operation. It is evident, therefore, that spring 48 plays a key role in the proper operation of the device and due to the fact that it is called upon to perform a variety of functions its design and interrelation with the detent and pawl are of critical importance to the proper functioning of the device.

In designing spring 48 it has been found that it is extremely important that the spring transmit its force in a single plane to thus eliminate any twisting movement in the spring which experience has proven will cause a spring failure frequency of such magnitude so as to render the device impractical for the purpose intended. For this reason a single turn torsion spring 48 of coplanar configuration is used. The spring is mounted between pawl 28 and detent 36 for coplanar movement by means of an upstanding pin 50 on the pawl 28 and a depending pin 52 on actuator 44 of detent 36. The pins when so arranged will both move in a common plane. It should be noted in this regard that it is essential that the arcuate movement of the two pins be such that although they move in a common plane they will not collide. In the preferred embodiment shown in the drawings, this relationship is accomplished by locating pin 50 so it will travel in an arcuate path which lies between the arcuate path of pin 52 and its pivot point (pin 38), which means that pin 52 will travel in a path which lies between the path of pin 50 and its pivot point (pin 30). It would also be possible to provide the desired non-colliding relationship by locating pin 50 so it will travel in an arcuate path which lies outside the arcuate path of pin 52, which in this instance means that pin 52 will travel in a path which lies outside of the path of pin 50 about its pivot point (pin 30). It is also essential that the two pins extend into the common plane in which the spring moves from opposite directions as shown. With the above described arrangement it will be seen that all flexure of spring 48 will be confined to a single plane and that the spring mounting pins will not collide. The operating life of the spring is thereby substantially increased over that which it would have if subjected to a twisting moment.

Despite the substantial lengthening of spring operating life provided by the above described arrangement, spring failures are still possible. A further feature of this invention, therefore, is concerned with the problem of damage to the mechanism which would result if pawl 28 and detent 36 were to get out of phase because of a spring failure. To obviate this possible source of trouble, detent 36 is provided with a pair of fail-safe radii 68 and 70 formed on the inner edge of each leg and a pair of actuating faces 72 and 74 formed on the upper edges of each leg of pawl 28. As shown in FIG. 3, radius 68 is adapted for engagement by face 72 as pawl 28 is pivoted to thus provide a positive driving engagement between the pawl and detent and thereby prevent the parts from ever getting out of phase with each other in the event of a spring failure. Similarly, when pawl 28 is pivoted back to its FIG. 3 position by abutment 56, fail-safe radius 70 on detent 36 will be positively engaged by face 74 on pawl 28 to maintain the proper phasing of the two parts.

Although but a single embodiment of the present invention has been illustrated and described, it will be apparent to those skilled in the art that various changes and modifications may be made therein without departing from the spirit of the invention or from the scope of the appended claims.

I claim:

1. A device of the character described comprising a mounting plate, a drive arm pivotally mounted on said plate, means for oscillating said drive arm, a ratchet wheel freely rotatably mounted on said plate, a drive pawl pivotally mounted on said drive arm for movement between one driving position and another, said drive pawl adapted to drive said ratchet wheel step-by-step in either direction when said drive arm is oscillated depending on the position of said driven pawl, a detent member pivotally mounted on said plate for movement between one detent position and another and adapted to engage said ratchet wheel and properly position and hold said wheel for step-by-step actuation thereof by said drive pawl, and reversing means adapted to pivot said pawl and detent member from one position to another and thereby reverse the direction in which said wheel is driven at intervals defined by a given number of drive arm oscillations, said reversing means including a reversing spring interconnected between said pawl and detent member, said detent member having a pair of fail-safe abutments formed thereon adapted for positive engagement by said pawl when said pawl is pivoted from one driving position to another to thereby prevent said pawl and detent from getting out of phase with each other in the event of a reversing spring failure.

2. A device according to claim 1 in which said spring is a single-turn, torsion spring of coplanar configuration mounted between said pawl and detent for coplanar movement when said pawl and detent pivot between one position and another.

3. A device according to claim 2 in which said reversing spring is fastened to said pawl and detent by means of pins on said pawl and detent extending into the plane of the spring from opposite directions.

4. A device according to claim 3 in which the arcuate paths of each of said pins lie between the path of the other pin and its pivot point.

References Cited in the file of this patent

UNITED STATES PATENTS

| | | |
|---|---|---|
| 315,883 | Arnold | Apr. 14, 1885 |
| 938,478 | Greenfield | Nov. 2, 1909 |
| 2,558,953 | Henninger et al. | July 3, 1951 |
| 3,020,774 | Kullmann | Feb. 13, 1962 |